Patented Apr. 26, 1949

2,468,423

UNITED STATES PATENT OFFICE 2,468,423

PROPYLENE GLYCOL SOLUTIONS OF DIHYDROXY ETHERS

Frank Milan Berger, William Bradley, and Frederick George Sayer, London, England, assignors to The British Drug Houses Limited, London, England, a British company No Drawing. Application August 28, 1946, Serial No. 693,584. In Great Britain June 28, 1946

2 Claims. (Cl. 167—30)

This invention is for improvements in or relating to ethers and has particular reference to a process for increasing the water-solubility of aryl β:γ-dihydroxypropyl ethers, e. g. phenyl β:γ-dihydroxypropyl ether and their nuclear-substituted derivatives.

Phenyl β:γ-dihydroxypropyl ether and certain of its nuclear-substituted derivatives and ring homologues have a value as therapeutic agents but this value is limited by their relatively slight solubility in water. Thus, p-chlorophenyl β:γ-dihydroxypropyl ether is only soluble in water to an extent of less than 1% at room temperature while o-tolyl β:γ-dihydroxypropyl ether is soluble to an extent less than about 2.0% at room temperature. An increase in the solubility of such β:γ-dihydroxypropyl ethers is very desirable and it is an object of the present invention to effect such increase in the water-solubility, particularly with a view to extending their therapeutic use.

We have now found that the solubility in water of phenyl β:γ-dihydroxypropyl ether and of its nuclear-substituted derivatives and in particular of p-chlorophenyl β:γ-dihydroxypropyl ether and of o-tolyl β:γ-dihydroxypropyl ether may be markedly increased in the presence of ethyl urea or propylene glycol (dihydroxypropane consisting substantially of 1:2-dihydroxypropane).

According to the present invention, a process for increasing the water-solubility of aryl β:γ-dihydroxypropyl ethers and particularly of p-chlorophenyl β:γ-dihydroxypropyl ether and o-tolyl β:γ-dihydroxypropyl ether comprises associating with the ether a proportion of ethyl urea or of propylene glycol or of a mixture of these two substances. The ether may be incorporated with the ethyl urea or propylene glycol and the mixture subsequently dissolved in water or the ether may be dissolved in an aqueous solution of the ethyl urea or propylene glycol.

The present invention may be carried into effect by any one of the following methods. The solution of the ether in aqueous propylene glycol may be prepared at a temperature higher than room temperature and the solution then allowed to cool. Alternatively, the propylene glycol may be heated with the ether and water may be added at any subsequent stage of the preparation of the solution. Again, the ether may be heated with a portion of the glycol and the remainder of the glycol and the water may subsequently be added either together or the glycol may be added followed by water. In a further method, the β:γ-dihydroxypropyl ether may be heated slightly above its melting point and then added to the propylene glycol, water being subsequently added to the mixture. In the case of o-tolyl β:γ-dihydroxypropyl ether (M. P. 68° to 70° C.) the temperature may with advantage be raised to 75° C.

Of these methods, the last two are particularly advantageous when employed in large scale practice.

It has been found that by use of the present invention, the water-solubility of p-chlorophenyl β:γ-dihydroxypropyl ether and of o-tolyl β:γ-dihydroxypropyl ether may be increased to a value of the order of 10%, a result not to be anticipated from the properties of the ethers or of ethyl urea or propylene glycol. Further, the increase in water-solubility is accompanied by an improvement in certain of the therapeutic properties, for example, the antibacterial properties of the ethers over and above the improvement associated with the solubility increase.

Following is a description by way of example of methods of carrying the invention into effect:

Example I

The solubility of o-tolyl β:γ-dihydroxypropyl ether in water at room temperature does not exceed 2%. When this ether is dissolved in water containing 8% by weight of ethyl urea a solution containing 3.2 g. of the ether per 100 ml. of solution may be obtained. Similarly, when the ether is dissolved in water containing 16% by weight of ethyl urea, a solution containing 6.4 g. of the ether per 100 ml. of solution may be obtained. Again, when the ether is dissolved in water containing 32% by weight of ethyl urea, a solution containing 12.8 g. of the ether per 100 ml. of solution may be obtained.

Example II

The solubility of p-chlorophenyl β:γ-dihydroxypropyl ether in water at room temperature does not exceed 1%. When the ether is dissolved in water containing ethyl urea, the solubility is increased as follows:

| Percent by weight of ethyl urea | g. ether per 100 ml. of of solution |
|---|---|
| 16 | 3.2 |
| 32 | 6.4 |
| 60 | 12.8 |

Example III

The solubility of o-tolyl β:γ-dihydroxypropyl ether in water at room temperature does not exceed 2%, as stated in Example I.

When the ether is dissolved in mixtures of propylene glycol and water in accordance with column 1 of the following table at the temperature ranges stated in column 2, the solutions obtained contained the number of grams of the ether stated in column 3 per 100 ml. of the propylene glycol solution.

| Volume of propylene glycol per 100 volumes of aqueous propylene glycol solution | Temperature range, °C. | g. ether per 100 ml. of aqueous propylene glycol |
|---|---|---|
| 15 | 21 to 24 | 1.5 to 1.7 |
| 30 | 21 to 25 | 2.6 to 2.8 |
| 40 | 24 to 28 | 6.6 to 7.5 |

It has been found that stable supersaturated solutions of the o-tolyl ether in aqueous propylene glycol can be obtained by preparing a solution at a temperature above room temperature and subsequently cooling to room temperature. Thus, a solution containing 10 g. of the o-tolyl ether in 100 ml. of aqueous propylene glycol containing 20 volumes of propylene glycol in 100 volumes of the aqueous propylene glycol solution prepared at a higher temperature and then allowed to cool to 20° C. may remain clear for at least several days.

We claim:

1. An aqueous-propylene glycol solution containing a therapeutically effective concentration of an ether selected from the group consisting of tolyl-$\beta$:$\gamma$-dihydroxypropyl and chlorphenyl-$\beta$:$\gamma$-dihydroxypropyl ethers, said solution containing a major proportion of water and a minor proportion of propylene glycol.

2. An aqueous-propylene glycol solution containing a therapeutically effective concentration up to 10% of an ether selected from the group consisting of tolyl-$\beta$:$\gamma$-dihydroxypropyl and chlorphenyl-$\beta$:$\gamma$-dihydroxypropyl ethers, said solution containing a major proportion of water and a minor proportion of propylene glycol.

FRANK MILAN BERGER.
WILLIAM BRADLEY.
FREDERICK GEORGE SAYER.

REFERENCES CITED

The following references are of record in the file of this patent:

UNITED STATES PATENTS

| Number | Name | Date |
|---|---|---|
| 2,075,018 | Bruson et al. | Mar. 30, 1937 |

FOREIGN PATENTS

| Number | Country | Date |
|---|---|---|
| 277,003 | Great Britain | May 17, 1928 |

OTHER REFERENCES

J. A. P. A., Prac. Pharm. Ed., June 1943, pages 194–195.

Coblentz: The Newer Remedies, 3rd ed., 1899, page 68.

Hartman et al.: American Journal of Surgery, Dec. 1939, pages 460–467.

Remington et al.: Practice of Pharmacy, 5th ed., J. B. Lippincott, 1907, pages 306, 308, 731.

Kamm: Qualitative Organic Analysis, John Wiley & Sons, Inc., pages 8–10.

Meleny: Report of May 15, 1945, to Committee on Medical Research of the Office of Scientific Research and Development, Report No. 12. Contract OEMcmr-334. 4 pages. Unclassified.

Zirkovic: Monatshefte, vol. 29 (1908), pages 952–958.